Nov. 21, 1939.  W. F. GROSS  2,181,016
PLANT PROTECTOR
Filed Nov. 28, 1938
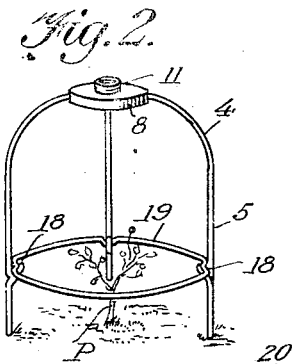
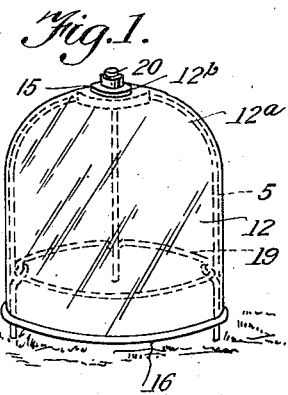
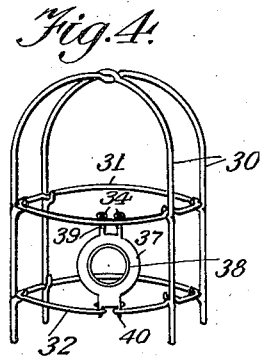
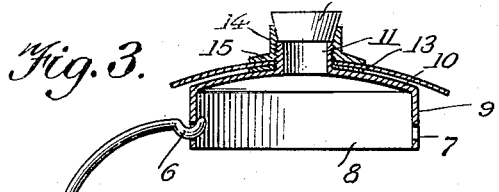
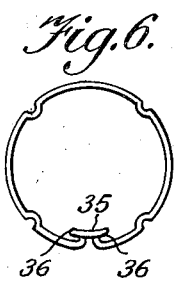
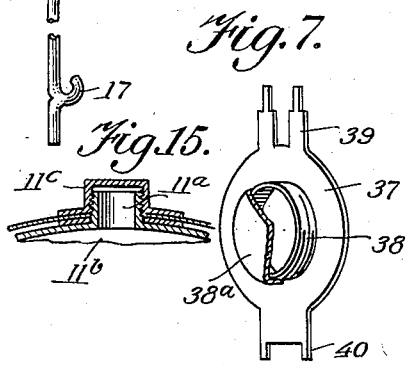
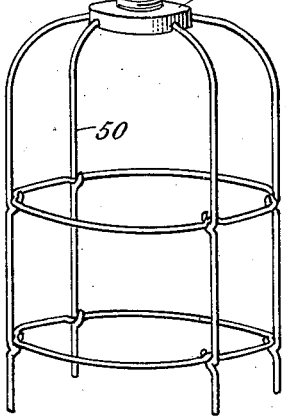
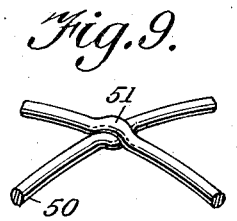
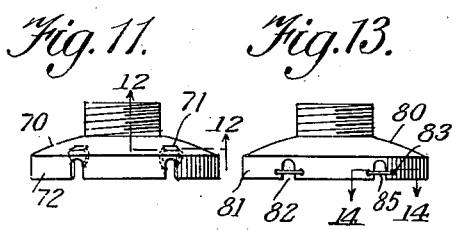
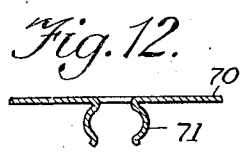
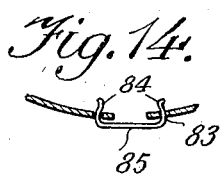
William F. Gross
INVENTOR
BY Victor J. Evans & Co.
ATTORNEYS Patented Nov. 21, 1939

2,181,016

UNITED STATES PATENT OFFICE 2,181,016

PLANT PROTECTOR

William F. Gross, De Pere, Wis.

Application November 28, 1938, Serial No. 242,846

3 Claims. (Cl. 47—28)

My invention relates to plant protectors and has as one of the principal objects thereof the provision of a simple inexpensive device for the protection of plants from frost, cold winds and the like.

Another object of my invention is to provide a plant protector including a frame and a transparent hood, the former of which may be left in place about the plant at all times, the latter of which may be quickly and easily applied to the former when needed thereby enabling the plant to be given the desired exposure to the sun and air and to cover the same during desired intervals to protect it against the injurious effects of insects, frost, cold winds and the like.

A further object of my invention is to provide a device of the character described wherein the hood is provided with means to permit ventilation therethrough.

An important object of my invention is to provide a device of the character described which may be quickly and easily collapsed for shipment or storage in a small space.

Another important object of my invention is to provide a device of the character described which is durable in use, efficient in operation and economical in manufacture.

Other objects and advantages will be apparent from the following description, appended claims and annexed drawing.

Referring to the drawing wherein like reference characters designate like parts throughout the several views:

Figure 1 is a perspective view of a preferred embodiment of my invention.

Figure 2 is a perspective view of the preferred embodiment having the hood removed from the frame.

Figure 3 is a detail horizontal sectional view of the hub construction of the preferred embodiment.

Figure 4 is a perspective view of a modified form of frame construction.

Figure 5 is a top plan view of the upper connecting ring used in the modified form illustrated in Figure 4.

Figure 6 is a top plan view of the lower connecting ring used in the modified form illustrated in Figure 4.

Figure 7 is a side elevation, on an enlarged scale, of the ventilating member inserted between the upper and lower connecting rings of the modified form to effect ventilation of the plant covered when the hood is in position on the frame.

Figure 8 is a perspective view of another modified form of frame construction.

Figure 9 is a detail perspective view of the frame members of the modified form depicted in Figure 8 and illustrating the interlocking connection of said members.

Figure 10 is a horizontal sectional view of a modified form of hub construction.

Figure 11 is a side elevation of another modified form of hub construction.

Figure 12 is a detail sectional view taken on the line 12—12 of Figure 11.

Figure 13 is a side elevation of a still further modified form of hub construction.

Figure 14 is a detail sectional view taken on the line 14—14 of Figure 13.

Figure 15 is a fragmentary detail sectional view of still another modified form of hub construction.

In the preferred embodiment of my invention illustrated in Figures 1 to 3 of the drawing inclusive, I provide a frame 4 comprising a ternary of detachable wire members 5, the upper ends of which are of an arcuate configuration and disposed towards each other, the lower ends being adapted to be inserted into the ground and embrace or bound a plant P centrally disposed therebetween. The upper ends of the members 5 are fashioned with arcuate shaped offset portions 6 extending within apertures 7 formed in the periphery of a skirt 8 of a hub 9, the latter being fashioned with an arcuate shaped top wall 10 and an open bottom as clearly illustrated in Figure 3.

The top wall 10 is provided with a centrally disposed sleeve 11 extending upwardly therefrom and threaded on the exterior thereof. A collapsible transparent hood 12 is fashioned with an open lower end and a dome shaped top wall 12a formed with a centrally disposed aperture 12b, through which the sleeve 11 extends.

Interposed between the top wall 12a of the hood and the top wall 10 of the hub 9 is a washer 13 surrounding said sleeve. A nut 14 is threaded on said sleeve and is provided with a flange 15 on the lower end thereof coacting with the washer 13 and wall 10 to clamp the hood 12 to the hub. The lower end of the hood is provided with a circumferentially extending flange 16 having engagement with the ground whereby the plant is enclosed therein and protected from undesirable weather conditions, insects, foreign matter and the like.

Above the lower ends, the members 5 are fashioned with inwardly offset sections 17 having outer ends disposed upwardly and arcuately to form hooks for yieldably receiving therein upwardly offset sections 18 of a ring 19 disposed within the members 5 for maintaining said members in spaced relation and against relative displacement. The upper end of the nut 14 is provided with an interiorly and outwardly tapered wall for accommodating therein a plug 20 whereby to close the bore of the sleeve 11.

In use, the parts being assembled as illustrated in Figures 1 and 3 of the drawing, the lower ends of the members 5 being inserted into the ground about the plant P with the flange 16 of the hood engaging the ground, the plant is protected from undesirable weather conditions, insects and foreign matter. In desirable weather, the nut 14 and plug 20 may be removed from the sleeve 11 to permit removal of the hood whereby the plant may be exposed to desirable weather conditions as illustrated in Figure 2.

In the modified form illustrated in Figures 4 to 7 inclusive of the drawing, a pair of frame members 30 bent intermediate their lengths are secured in spaced relation relative to each other by means of upper and lower connecting rings 31 and 32 respectively in the same manner as in the preferred embodiment. The upper ring is provided with a pair of inwardly disposed eyes 34 while the lower ring is provided with an inwardly offset section 35 forming a pair of oppositely disposed hook shaped sections 36. A ventilating member 37 of an arcuate configuration is provided with a threaded ventilating neck 38 adapted to receive a closure cap 38a and with oppositely disposed upper and lower legs 39 and 40 respectively. The legs 39 are fashioned with upwardly extending reduced portions detachably fitting within the eyes 34 and the lower legs 40 are snapped and secured within the hook shaped sections 36 whereby to maintain said member 37 in fixed position between the rings 31 and 32. It is understood that the hood fits over the members 30 and rests thereon, said hood being provided on one side with an opening receiving the ventilating neck 38 in said member 37 whereby the plant may obtain ventilation.

In the modified form illustrated in Figure 8, the upper ends of the frame members 50 are provided with offset loop sections 51 having interlocking and yieldably detachable engagement with each other as clearly illustrated in Figure 9. In this construction, the skirt of the hub 52 is formed with slots having open lower ends for receiving the upper ends of the members 50 therethrough.

In the modified form of hub construction illustrated in Figure 10, a lower plate 60 is fashioned on the upper face thereof with radially extending spaced grooves 61 for accommodating therein the upper ends of frame members 62. A coacting plate 63 is secured to the plate 60 by means of screws 64 and serves to clamp the upper ends of the frame members 62 therebetween.

In the modified form of hub illustrated in Figures 11 and 12, the inner face of the top wall 70 is fashioned with downwardly extending spring clips 71 for clampingly engaging the ends of the frame members whereby to secure the latter to the hub 72.

In the modified form of hub 80 illustrated in Figures 13 and 14, the skirt 8 thereof is provided with slots 82 having open lower ends for receiving therethrough the ends of the frame members and above said open lower ends of the slots, the skirt is provided with a pair of apertures 83, one on each side of the respective slots and extending through said apertures are resilient arms 84 of a clip 85 whereby to underlie the frame members 5 and maintain the latter in connected relation with the hub.

In the modified form illustrated in Figure 15 the sleeve 11a of the hub 11b has threaded thereto a flanged closure cap 11c in lieu of the plug 20 employed in the preferred embodiment.

It is obvious that the invention is not confined to the herein described use therefor as it may be utilized for any purpose to which it is adaptable. It is therefore to be distinctly understood that the invention is not limited to the specific construction as illustrated and described, as the same is only illustrative of the principles of operation which are capable of extended application in advance forms, and that the invention comprehends all construction within the scope of the appended claims.

What I claim is:

1. In a knock-down plant protector construction, a frame having a centrally disposed hub, frame members detachably connected to said hub at their upper ends, spaced rings detachably connected to said members for maintaining the latter in adjusted position about a plant, a ventilating member detachably connected to said rings and extending therebetween and fashioned with a ventilating opening, and a transparent hood covering said frame and enclosing said plant therein, said hood detachable from said frame whereby to expose said plant to desirable weather conditions, said hood fashioned with a ventilating opening registering with said first mentioned opening whereby to provide ventilation for said plant.

2. In a knock-down plant protector construction, a frame having a centrally disposed hub, frame members detachably connected to said hub at their upper ends, spaced rings detachably connected to said members for maintaining the latter in adjusted position about a plant, a ventilating member detachably connected to said rings and extending therebetween and fashioned with a ventilating opening, a transparent hood covering said frame and enclosing said plant therein, said hood detachable from said frame whereby to expose said plant to desirable weather conditions, said hood fashioned with a ventilating opening reigstering with said first mentioned opening whereby to provide ventilation for said plant, and means detachably connecting said hood to said hub for maintaining the latter is adjusted position on said frame relative to said ventilating member.

3. In a knock-down plant protector construction, a frame having a centrally disposed hub, frame members detachably connected to said hub at their upper ends, a ring detachably connected to said members for maintaining the latter in adjusted position about a plant, a ventilating member detachably connected to said ring and fashioned with a ventilating opening, and a hood covering said frame and enclosing said plant therein, said hood detachable from said frame whereby to expose said plant to desirable weather conditions, and means detachably connecting said hood to said hub for maintaining said hood in adjusted position on said frame.

WILLIAM F. GROSS.